Patented Aug. 31, 1937

2,091,481

UNITED STATES PATENT OFFICE 2,091,481

ALKYLATED AND ARALKYLATED POLY-AMINOANTHRAQUINONES

Georg Kränzlein and Arthur Wolfram, Frankfort-on-the-Main, and Emil Hausdörfer, Hofheim in Taunus, Germany, assignors to General Aniline Works, Inc., New York, N. Y., a corporation of Delaware No Drawing. Application June 14, 1935, Serial No. 26,702. In Germany June 20, 1934

13 Claims. (Cl. 260—59)

The present invention relates to alkylated and aralkylated poly-aminoanthraquinones.

We have found that the 4,8-diaminoanthrarufin-dimethyl ether which, for instance, is obtainable by nitrating anthrarufin-dimethyl ether and reducing the nitro-compound, may easily be caused to react with primary amines, in which the NH2-group is aliphatically bound, for instance, with aliphatic and hydroaromatic primary amines or primary amines of the aralkyl series. The reaction is carried out, for instance, at temperatures between 120° C. and 200° C. According to the conditions under which the reaction occurs, there is an exchange of one or both methoxy groups or of both methoxy and both amino-groups.

The reaction may be effected in the presence of a solvent such as, for instance, alcohol; but it may also be effected in an excess of the amine itself. If necessary, the reaction is performed in a pressure vessel.

Beside 4,8-diaminoanthrarufin-dimethyl ether there may be used for the reaction other 4,8-diaminoanthrarufin-dialkyl ethers, for instance the ethyl ether.

The products obtained may be characterized by the following general formula:

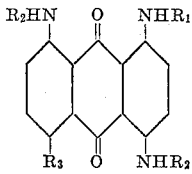

wherein $R_1$ means alkyl, hydroxy-alkyl, aralkyl of the benzene series or a cycloalkyl group, $R_2$ means hydrogen, alkyl, hydroxyalkyl or a cycloalkyl group, $R_3$ means hydroxy, alkoxy, NH-alkyl, NH-alkylhydroxy, NH-aralkyl of the benzene series or a NH-cycloalkyl group. They serve as acetate silk dyestuffs or, when sulfonated, as wool dyestuffs.

The following examples serve to illustrate the invention, but they are not intended to limit the invention thereto; the parts are by weight:

(1) 90 parts of a 4,8-diaminoanthrarufin-dimethyl ether are heated in a pressure vessel for 20 hours at 130° C. with 112 parts of methylamine in 750 parts of alcohol. After cooling, black-violet crystals are obtained which dissolve in concentrated sulfuric acid to a blue-green solution, in alcohol to a violet solution. Acetate silk is dyed by this body intense blue-violet tints. On heating a solution of the body in concentrated sulfuric acid at 100° C., saponification of the OCH3-group takes place and the color of the solution turns from blue-green to yellow (in a thin layer). By working up in the usual manner a product is obtained which has a very good affinity for acetate silk and yields thereon very fast blue tints.

The product has probably the following formula:

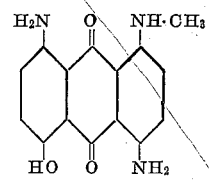

The black-violet product obtained seems to be a mixture, although it forms very well defined crystals. By recrystallization from chlorobenzene a compound may be isolated therefrom which melts at 276° C. to 277° C., dissolves in concentrated sulfuric acid to a green solution and in alcohol to a blue-violet solution. This product dyes acetate silk tints which are somewhat more bluish than those obtained with the crude product. The compound melting at 276° C. to 277° C. behaves in concentrated sulfuric acid of 100° C. in the same manner as the crude product. A dark blue body is obtained which dyes acetate silk tints of the same intensity and fastness, but of a somewhat more reddish shade. From the behavior in concentrated sulfuric acid of the product of the reaction of 4,8-diaminoanthrarufin-dimethyl ether with methylamine it may be concluded that only one methoxy-group has been exchanged for the methylamine radical whereas the other methoxy-group has remained unchanged and may be saponified.

According to the results obtained, the analysis and the determination of the content of methoxy-groups in the compound melting at 276° C. to 277° C., the latter is supposed to have the following formula:

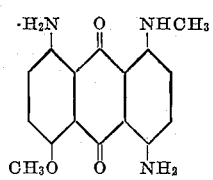

(2) 25 parts of 4,8-diaminoanthrarufin-dimethyl ether are heated in a pressure vessel with 65 parts of methylamine in 450 parts of alcohol for 5 hours at 180° C. After cooling, a crystalline dark-blue product, having a metallic luster and melting at 308° C. to 310° C. is obtained; it dissolves in concentrated sulfuric acid to a reddish-brown solution and to a blue solution in alcohol. It dissolves easily in dilute mineral acids with formation of a violet salt. It dyes acetate silk greenish-blue tints.

According to the analysis the product is 1,4,5,8-tetramethylaminoanthraquinone of the following formula:

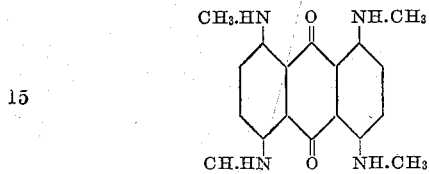

(3) 25 parts of 4,8-diaminoanthrarufin-dimethyl ether are heated in a pressure vessel for 20 hours at 130° C. with 50 parts of ethyl amine in 450 parts of alcohol. By working up the product in the manner described in Examples 1 and 2, a dark-blue product is obtained which dissolves in concentrated sulfuric acid to a green-blue solution and in alcohol to a violet solution. By recrystallization from chlorobenzene beautiful crystals having a green metallic luster and melting at 245° C. to 252° C. may be isolated. It seems that the product is a mixture as is the case with the analogous methylamine product. It dyes acetate silk very intense blue tints. The dyeing has very good properties of fastness. By heating the product in concentrated sulfuric acid to 100° C., saponification occurs, as in the process of Example 1. The color of the solution thereby turns from blue-green to red. The saponification product thus obtained dyes acetate silk tints which are considerably more greenish than those obtained with the original unsaponified product. The affinity to the fibre is very good, the properties of fastness are likewise good.

(4) 25 parts of 4,8-diaminoanthrarufin-dimethyl ether are heated in a pressure vessel for about 5 hours at about 180° C. with 50 parts of ethylamine in 450 parts of alcohol. By working up in the manner described in the preceding examples dark-blue crystals, having a metallic luster, are obtained. By recrystallization from nitrobenzene a product is obtained which melts at 305° C. It dissolves in concentrated sulfuric acid to an olive-yellow solution and in alcohol to a blue solution. When it is warmed in concentrated sulfuric acid, no change of the color occurs from which fact it must be concluded that a methoxy-group is no longer present. Acetate silk is dyed blue tints. The affinity is good.

According to the analysis the dyestuff has the following formula:

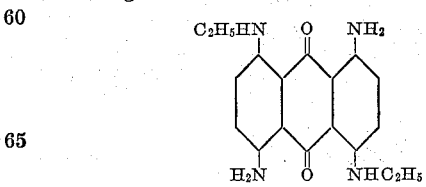

(5) 25 parts of 4,8-diaminoanthrarufin-dimethyl ether are heated to boiling for 5 hours with 250 parts of amino-ethanol. On cooling, beautiful blue-violet crystals, having a metallic luster, separate. By recrystallization from nitrobenzene, a product is obtained which, after sintering, melts at 294° C., and dissolves in concentrated sulfuric acid to a brown-red solution. The substance dissolves sparingly in alcohol to a blue solution. When warmed the sulfuric acid solution shows no change of color. Acetate silk is dyed only feebly blue tints.

According to the analysis, the compound corresponds with the following formula:

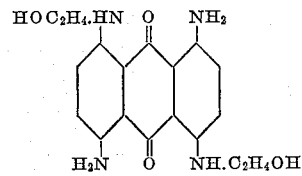

(6) 25 parts of 4,8-diaminoanthrarufin-dimethyl ether are heated to boiling for 15 hours with 250 parts of amino-ethanol. On cooling, a blue product separates which dissolves in concentrated sulfuric acid to a brown-red solution and in alcohol to a cornflower-blue solution. When recrystallized from nitrobenzene, the compounds melts at 280° C. to 285° C. Acetate silk is dyed only feebly blue tints.

According to the analysis a product is obtained which corresponds with the formula of 1,4,5,8-tetra-hydrox-ethyl-aminoanthraquinone:

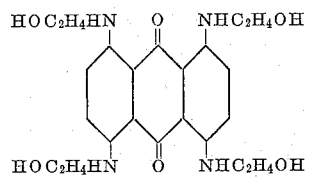

(7) 100 parts of 4,8-diaminoanthrarufin-dimethyl ether are heated to boiling for about 6 hours with 1000 parts of benzylamine. On cooling, beautiful blue-violet crystals, having a metallic luster, separate. They may be recrystallized from ortho-dichloro-benzene. Beautiful blue leaflets, having a metallic luster, are obtained which melt between 250° C. and 270° C. according to the rapidity of heating them. They dissolve in concentrated sulfuric acid to a nearly colorless solution; they dissolve sparingly in alcohol. Acetate silk is dyed only feebly blue tints.

According to the analysis of the purified product values are obtained which lie between the values of the following two compounds:

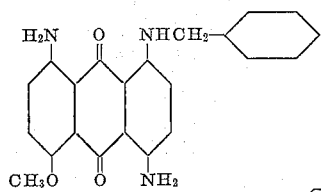

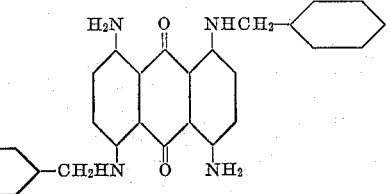

By heating, for instance, to boiling, the above product of the reaction from 4,8-diaminoanthrarufin-dimethyl ether and benzylamine for a prolonged time, for instance, for about 6 hours, in ortho-dichlorobenzene, a compound of unknown constitution melting at 235° C. is obtained which dissolves in concentrated sulfuric acid to a colorless solution and easily in alcohol to a blue solution. This compound dyes acetate silk greenish-blue tints; it possesses a very good affinity for the fiber; the dyeings have very good properties of fastness.

The same dyestuff is obtainable by heating for a short time, for instance, for about ½ hour, at 700° C., the product of the reaction of 4,8-diaminoanthrarufin-dimethyl ether with benzylamine in concentrated sulfuric acid.

(8) A solution of 100 parts of 4,8-diamino-anthrarufin-dimethyl ether in 1000 parts of cyclo-hexylamine is heated to boiling for about 10 hours. The crude product which separates on cooling is a mixture which, by dissolving in and reprecipitating from nitrobenzene, may be separated as follows into 3 components:

From nitrobenzene a dark-violet product crystallizes which melts at 234° C. to 237° C., dissolves in sulfuric acid to a violet solution and in alcohol to a blue solution. It dyes acetate silk intense reddish-violet tints. By diluting the nitrobenzene mother liquor with a large quantity of hexahydrobenzene, beautiful great violet-blue leaflets, having a metallic luster, are precipitated; these melt, but not sharply, between 140° C. and 155° C. They dissolve in concentrated sulfuric acid to a green solution and in alcohol to a cornflower-blue solution. Acetate silk is dyed greenish-blue tints. By steam-distilling the nitro-benzene-hexahydrobenzene mother liquor, there remains as third component a crystalline body, having likewise a metallic luster, which may be recrystallized from ortho-dichlorobenzene. It melts at 253° C. to 254° C., dissolves in concentrated sulfuric acid to a light yellow solution and in alcohol to a blue solution; it dyes acetate silk tints which are more reddish than those obtained with the second component.

According to the analysis, the third component, melting at 253° C. to 254° C., contains mainly the compound 1,5-diamino-4,8-dicyclohexylaminoanthraquinone:

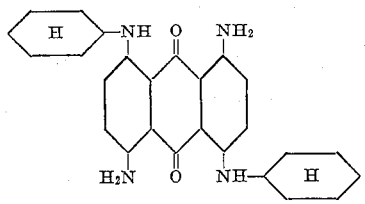

We claim:

1. The process which comprises heating a 4,8-diamino-anthrarufin-dialkylether with a primary amine of the group consisting of alkylamines, hydroxyalkylamines, cylcohexylamine and benzylamine.

2. The process which comprises heating at a temperature of about 120° C. to about 200° C. a 4,8-diamino-anthrarufin-dialkylether with a primary amine of the group consisting of alkylamines, hydroxyalkylamines, cylcohexylamine and benzylamine.

3. The process which comprises heating a 4,8-diamino-anthrarufin-dialkylether with a primary alkylamine.

4. The process which comprises heating at a temperature of about 120° C. to about 200° C. a 4,8-diamino-anthrarufin-dialkylether with a primary alkylamine.

5. The process which comprises heating a 4,8-diamino-anthrarufin-dialkylether with a primary alkylamine in the presence of a solvent.

6. The process which comprises heating at a temperature of about 120° C. to about 200° C. a 4,8-diamino-anthrarufin-dialkylether with a primary alkylamine in the presence of a solvent.

7. The process which comprises heating a 4,8-diamino-anthrarufin-dialkylether with a primary alkylamine and saponifying the product, when still containing an alkoxy-group, by means of an acid so as to convert the alkoxy-group into a hydroxyl-group.

8. The process which comprises heating at a temperature of about 120° C. to about 200° C. a 4,8-diamino-anthrarufin-dialkylether with a primary alkylamine and saponifying the product, when still containing an alkoxy-group, by means of an acid so as to convert the alkoxy-group into a hydroxyl-group.

9. The process which comprises heating a 4,8-diamino-anthrarufin-dialkylether with a primary alkylamine in the presence of a solvent and saponifying the product, when still containing an alkoxy-group, by means of an acid so as to convert the alkoxy-group into a hydroxyl-group.

10. The process which comprises heating at a temperature of about 120° C. to about 200° C. a 4,8-diamino-anthrarufin-dialkylether with a primary alkylamine in the presence of a solvent and saponifying the product, when still containing an alkoxy-group, by means of an acid so as to convert the alkoxy-group into a hydroxyl-group.

11. The process which comprises heating 4,8-diamino-anthrarufin-dimethylether at 130° C. for about 20 hours in a pressure vessel with methylamine in the presence of alcohol.

12. The process which comprises heating 4,8-diamino-anthrarufin-dimethylether at 130° C. for about 20 hours in a pressure vessel with methylamine in the presence of alcohol and saponifying the product still containing a methoxy-group by means of an acid so as to convert the methoxy-group into a hydroxyl-group.

13. The process which comprises heating 4,8-diamino-anthrarufin-dimethylether at about 180° C. for about 5 hours in a pressure vessel with ethylamine in the presence of alcohol.

GEORG KRÄNZLEIN.
ARTHUR WOLFRAM.
EMIL HAUSDÖRFER.